US006965874B2

(12) United States Patent
Joseph

(10) Patent No.: US 6,965,874 B2
(45) Date of Patent: Nov. 15, 2005

(54) METHOD, APPARATUS AND PROGRAM PRODUCT FOR FACILITATING TRANSFER OF VEHICLE LEASES

(76) Inventor: Ron Joseph, 403 Vine St. 2nd Floor, Cincinnati, OH (US) 45202

( * ) Notice: Subject to any disclaimer, the term of this patent is extended or adjusted under 35 U.S.C. 154(b) by 294 days.

(21) Appl. No.: 09/775,002

(22) Filed: Feb. 1, 2001

(65) Prior Publication Data

US 2001/0034690 A1 Oct. 25, 2001

Related U.S. Application Data

(60) Provisional application No. 60/180,264, filed on Feb. 4, 2000.

(51) Int. Cl.[7] ........................ G06F 17/60
(52) U.S. Cl. ........................ 705/26
(58) Field of Search ........................ 705/26, 27; 707/206

(56) References Cited

U.S. PATENT DOCUMENTS

| | | | | |
|---|---|---|---|---|
| 3,573,747 A | | 4/1971 | Adams et al. | 340/172.5 |
| 3,581,072 A | | 5/1971 | Nymeyer | 235/152 |
| 4,789,928 A | | 12/1988 | Fujisaki | 364/401 |
| 5,063,507 A | | 11/1991 | Lindsey et al. | 364/408 |
| 5,262,942 A | | 11/1993 | Earle | 364/408 |
| 5,493,490 A | | 2/1996 | Johnson | 364/401 |
| 5,500,793 A | | 3/1996 | Deming, Jr. et al. | 364/401 |
| 5,664,115 A | | 9/1997 | Fraser | 705/37 |
| 5,774,883 A | | 6/1998 | Andersen et al. | 205/38 |
| 5,845,265 A | | 12/1998 | Woolston | 705/37 |
| 5,950,178 A | | 9/1999 | Borgato | 705/37 |
| 6,237,009 B1 | * | 5/2001 | Waldo et al. | 707/206 |
| 2002/0099618 A1 | | 7/2002 | Stiberman | |

FOREIGN PATENT DOCUMENTS

AU WO 98/12656 * 3/1998 ........... G06F/17/60

OTHER PUBLICATIONS

"Transferring Your Car Payments? Take Heed," Shelby Gilje, Shelby, Seattle Times, Seattle, Washington, Jun. 11, 1989, p. K.1.*
"Cashback Enterprise Online Auto Leasing"—1991.*

* cited by examiner

*Primary Examiner*—Jeffrey A. Smith
*Assistant Examiner*—Matthew S. Gart
(74) *Attorney, Agent, or Firm*—Wood, Herron & Evans, L.L.P.

(57) ABSTRACT

A method for facilitating transfer of vehicle leases between parties involves providing a database of vehicle lease records concerning vehicle leases available for transfer. A search engine is provided for searching the vehicle lease database according to entered criteria, the search engine operable to identify available vehicle lease records which meet the entered criteria. Access to the search engine is provided via a computer network. Upon execution of a given search including criteria entered by a searching user, the searching user is provided, via the computer network, with vehicle lease information concerning at least one matching vehicle lease record which meets the entered criteria of the given search, if such a matching vehicle lease record exists.

43 Claims, 10 Drawing Sheets

METHOD, APPARATUS AND PROGRAM PRODUCT FOR FACILITATING TRANSFER OF VEHICLE LEASES

This application claims the benefit of provisional application Ser. No. 60/180,264 filed Feb. 4, 2000.

TECHNICAL FIELD

The present invention relates to a system and method for facilitating transferring vehicle leases from a lessee to a new lessee and, more particularly, a system and method for facilitating transferring vehicle leases via the Internet or other large scale computer network.

BACKGROUND OF THE INVENTION

For a variety of reasons persons often choose to lease a vehicle rather than purchase it outright. Many times the lease option provides the ability to lower monthly payments, permitting a person to better afford his or her vehicle of choice. One problem associated with vehicle leases is their fixed term. In some situations a vehicle lessee desires to get out of the lease prior to termination. For example, such motivation to get out of a lease can be driven by a desire to obtain a different vehicle or a desire to reduce monthly payments. Often times the fees associated with terminating a lease early are undesirably high, but the fees associated with transferring the lease to another party may be less substantial or non-existent.

Other impediments to vehicle lease transfers exist, including a general lack of consumer information concerning the ability to transfer as well as liability issues raised for lessees who wish to transfer their lease.

Accordingly, it would be advantageous to provide a system and method for facilitating the transfer of vehicle leases between parties.

SUMMARY OF THE INVENTION

In one aspect, a method for facilitating transfer of automobile leases involves providing a website which displays a menu giving a visitor an option of either creating a record including details of the visitor and of a leased automobile whose lease the visitor intends to assign, or viewing a list of records, each record including a description of a leased automobile and an owner thereof. If the visitor intends to create a record, the visitor is directed to a page at the website where the visitor can input information pertaining to a leased automobile and information to enable another visitor to the website to contact the visitor. The record created by the visitor is stored in a database. If the visitor intends to view a record or records, the visitor is directed to a page at the website where the visitor can view at least one record of a leased automobile.

In another aspect, a method for facilitating transfer of vehicle leases between parties involves providing a database of vehicle lease records concerning vehicle leases available for transfer. A search engine is provided for searching the vehicle lease database according to entered criteria, the search engine operable to identify available vehicle lease records which meet the entered criteria. Access to the search engine is provided via a computer network. Upon execution of a given search including criteria entered by a searching user, the searching user is provided, via the computer network, with vehicle lease information concerning at least one matching vehicle lease record which meets the entered criteria of the given search, if such a matching vehicle lease record exists.

In still a further aspect, a method for facilitating transfer of vehicle leases between parties involves providing a database of vehicle lease records concerning vehicle leases available for transfer. Access to at least certain information concerning vehicle lease records in the vehicle lease database is provided via a computer network. A lease action engine is provided for modifying the vehicle lease database, and controlled access to the lease action engine is provided via the computer network. Upon addition of a vehicle lease record to the vehicle lease database by a listing user via the lease action engine, the entered vehicle lease record of the vehicle lease database is associated with the listing user. The lease action engine enables the listing user to delete or modify an existing vehicle lease record of the vehicle lease database only if the existing vehicle lease record is associated with the listing user.

In yet another aspect, a method for facilitating transfer of vehicle leases between parties involves providing a database of vehicle lease records concerning vehicle leases available for transfer, each record including at least vehicle identifying information and listing user identifying information. Searching users are provided access to the database via a web site. A listing user may, via the web site, electronically initiate a lease transfer of a vehicle associated with a given vehicle lease record to an identified searching user.

In still another aspect, a computer-based system for facilitating transfer of vehicle leases between parties includes a web site computer system including a database of vehicle lease records concerning vehicle leases available for transfer; and an Internet accessible search engine for searching the vehicle lease database according to entered criteria, the search engine operable to identify available vehicle lease records which meet the entered criteria. The search engine is operable upon execution of a given search including criteria entered by a searching user, to produce a web page providing the searching user with access to at least certain vehicle lease information concerning at least one matching vehicle lease record which meets the entered criteria of the given search, if such a matching vehicle lease record exists. The search engine is further operable upon input by the searching user to (i) store the entered criteria of the given search, (ii) associate the stored criteria with at least an e-mail of the searching user, (iii) conduct at least one future automated search of the vehicle lease database for vehicle lease records meeting the stored criteria, and (iv) initiate e-mail notification of the searching user in event the future automated search identifies at least one matching vehicle lease record. An Internet accessible lease action engine enables modifying the vehicle lease database, the lease action engine producing at least one web page for the entry of information for a vehicle lease record to be added to the vehicle lease database by a listing user. The lease action engine is operable to associate an added vehicle lease record of the vehicle lease database with the listing user upon addition of the added vehicle lease record to the vehicle lease database. The lease action engine is further operable to produce at least one web page for enabling a given user to delete or modify an existing vehicle lease record of the vehicle lease database only if the listing user associated with the existing vehicle lease record is the given user.

DETAILED DESCRIPTION

One embodiment of a leasing system and method is described with reference to drawing FIGS. 1–3. In such drawings, each rectangular block (with the exception of blocks 50, 52, 54 and 56) represents a computer generated page, such as a web page, which may be accessible via the Internet. The entries in such "web page blocks" which include associated path lines represent links to other web pages. Entries in such "web page blocks" which do not include associated path lines represent either displayed information or information to be entered or identified by a user as will become apparent through the explanation below.

Figure 1:
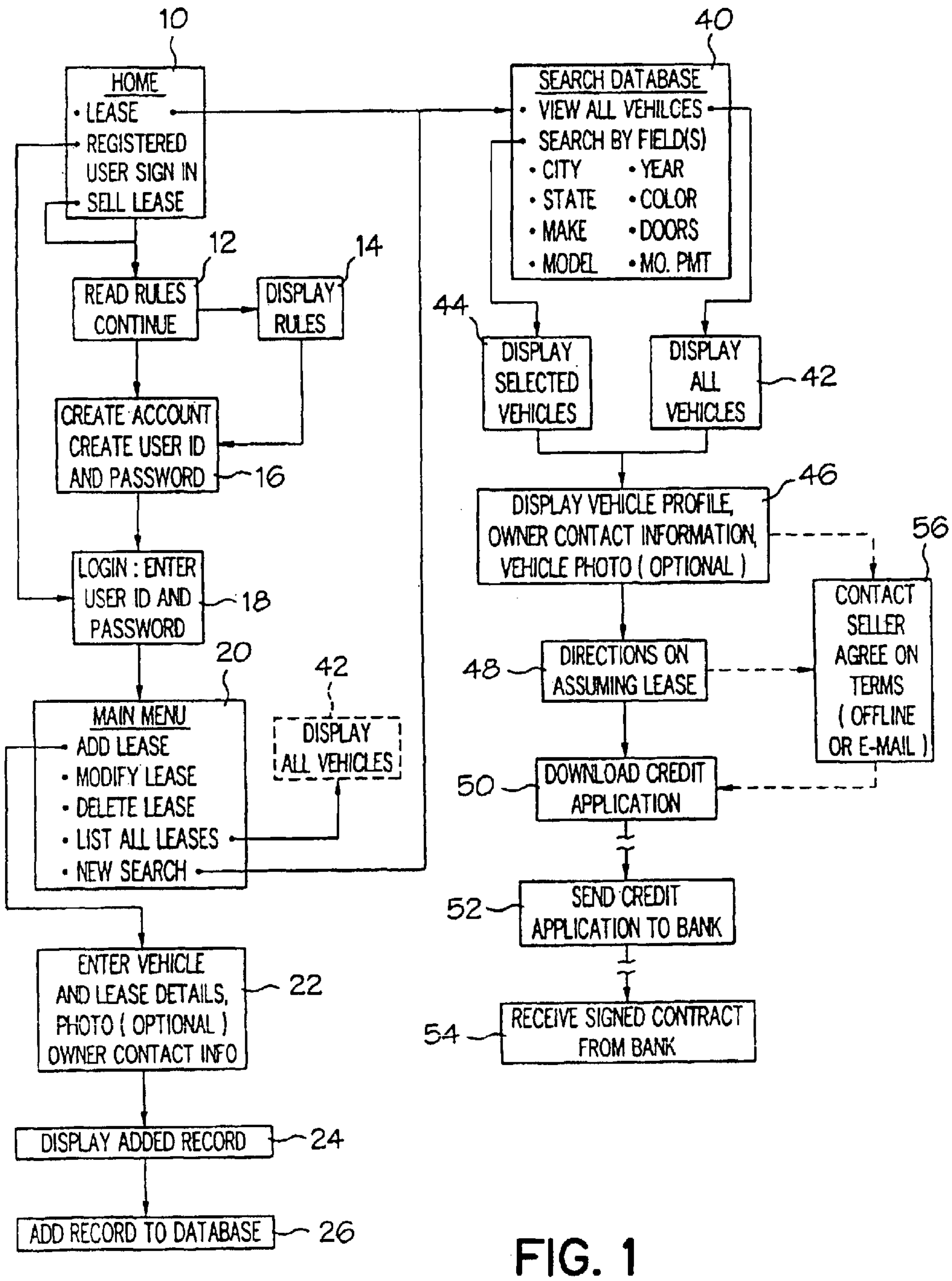
FIG. 1 is a schematic web page flow chart showing one embodiment of a lease transfer system and method.

As shown in FIG. 1, an individual, such as a lease owner, who intends to assign a vehicle lease first accesses the home page 10 of the Website. At this home page 10, the individual is introduced to the Website and is presented with computer generated buttons which activate links which are selectively activated by the individual (e.g. by mouse click) depending on whether he or she intends to assume a vehicle lease "LEASE"), sell a vehicle lease ("SELL LEASE") or, if the individual has already visited the site and registered with the site, sign in and view his or her account ("REGISTERED USER SIGN IN"). If the individual is a first-time visitor the individual so indicates by clicking on the icon on the home page 10 and is directed to a page 12 which displays the rules or gives the individual a link to the rules and a link to proceed by confirming that the rules have been read. After reading the rules, which optionally can be displayed at linked to page 14, the lease owner is sent to a page or screen 16 at which the lease owner creates an account by entering a user identification code ("user ID") and password.

The lease owner then reenters his or her own ID and password and logs on, as shown in web page block 18 in FIG. 1. Once having logged in, the lease owner is directed to a Main Menu page 20 which provides link options which include adding a new vehicle lease ("ADD LEASE"), modifying an existing vehicle lease ("MODIFY LEASE"), deleting an existing vehicle lease ("DELETE LEASE"), listing all of the leases entered by that lease owner ("LIST ALL LESES"), or searching for a particular vehicle lease in a search database ("NEW SEARCH").

If the lease owner intends to add a lease, he or she is directed to a screen or page 22 at which the lease owner is prompted to enter information pertinent to the leased vehicle and lease to be assigned. Such information may include the lessors city, state and e-mail; the make, model, year, color, # of doors, and mileage of the vehicle as well as any additional lease owner comments on the vehicle; and lease information including miles allowed on lease, monthly lease payment, months remaining on lease, and down payment required to acquire the lease, if any. Once the information has been entered, the newly created record is displayed as indicated at page block 24. At this point, as indicated at page block 26, the lease record is entered into the search database for access by interested users.

Figure 2:
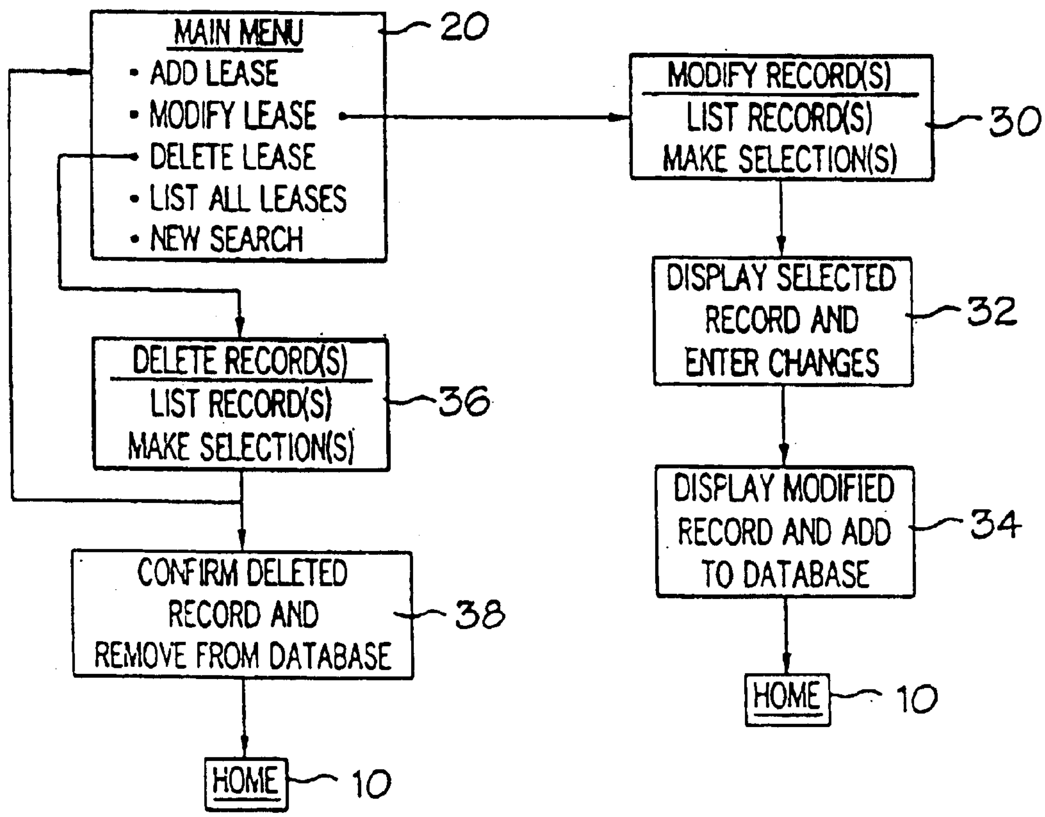
FIG. 2 is a schematic web page flow chart showing an aspect of the system and method of FIG. 1 in which a stored vehicle lease record is modified or deleted.

As shown in FIG. 2, if the lease owner wishes to modify a lease, from the Main Menu page 20, the lease owner is linked to a "Modify Records" page 30. Screen or page 30 lists all of the lease records created by that lease owner and entered into the database, and prompts the lease owner to select a particular lease to be modified. The user selects a particular lease by mouse-clicking on the appropriate record, and is linked to a screen or page 32 which displays the record to be modified.

At that point, the lease owner modifies the data in the field or fields of the record as desired and indicates approval of the modified record by clicking on an appropriate action button. As indicated at page block 34, the modified record is displayed and entered into the database, replacing the original record. The lease owner is then sent back to the home page 10.

In the alternative, if the lease owner intends to delete a lease, that option is selected in the Main Menu page 20 and the lease owner is linked to a screen, represented by block 36, which displays all of the lease records entered by the lease owner. The lease owner then indicates by a mouse click which lease or leases are to be deleted, and mouse clicks on an action button to delete the record or records marked for deletion. The lease owner is then linked to a screen or page 38 which indicates that the selected lease records have been deleted from the database. The lease owner is than given the option of returning to the home page 10, or in the alternative, adding a lease, deleting a lease, modifying a lease, listing all leases, or viewing the Main Menu.

Referring back to FIG. 1, if an individual accessing the home page 10 intends to assume (or "buy") a lease, the appropriate virtual button ("LEASE") is activated and the lease buyer is directed to a "Search Database" screen or page 40. It should be noted that the page indicated at block 40 can be accessed from a number of locations at the Website, including the Main Menu page 20.

From the Search Database page 40 the lease buyer can select either to view all vehicles in the database, and be linked to "Displaying All Vehicles" at page block 42, or can submit certain parameters, including the city and state of the residence of the owner of the vehicle; the make, model, year, color and number of doors on the vehicle; and/or the amount of the monthly payment of the lease. Once such information is communicated to the system, which occurs when the lease buyer clicks a virtual button labeled "View Vehicles", a search of the database is made based upon the entered criteria, and the lease buyer is linked to a "Display Selected Vehicles" screen or page 44 which displays all of the vehicles meeting the selected or entered criteria.

From the screen or page 42 or 44 the lease buyer selects a particular vehicle and is instructed to click on the year date of the vehicle, which will pull up a "Display Vehicle Profile" screen or page 46 which displays all of the information pertaining to that vehicle. The lease buyer is then provided with the option of calling up a screen or page 48 which displays the directions pertaining to assuming the lease.

At this point, the lease buyer has the option of downloading a credit application, shown at page block 50, filling out the credit application and sending it to the lessor bank, indicated at page block 52. Where a bank accepts only credit applications with original signatures, the transmission of a completed credit application from a lease buyer to a bank may be performed offline, with the actual lease document. However, it is within the scope of this embodiment to provide a system in which a completed credit application is transmitted electronically to a bank with appropriate signature verification protocols. The final step with respect to the assignment of the lease from the lease owner to the lease buyer, is to receive the signed credit application and lease transfer documentation from the bank, shown at block 54.

At any point along this procedure, that is, from blocks 46 through 54, the lease buyer contacts the lease seller, shown as block 56. At this point, the lease buyer can contact the lease seller through information displayed on the screen 46, in which the lease seller may provide an e-mail address, telephone number, mail address and so on. Once the lease buyer has contacted the lease seller, the parties can negotiate offline (meaning not through use of the subject Website) with respect to the terms of the lease assumption. These terms would include the payment, if any, to be exchanged between the lease buyer and the lease seller to compensate for, for example, a security deposit or a capital reduction payment. Of course, it is within the scope of the invention to provide a system in which payment can be made by a lease seller to a lease buyer in order to make the assumption of the lease more attractive.

While it is likely that the lease seller will be contacted by a potential lease buyer prior to the lease buyer downloading a credit application (block 50), it is within the scope of this embodiment to provide a system in which the lease buyer can obtain the credit information first, to verify that the lease buyer could qualify to assume a lease having a particular monthly payment amount.

Figure 3:
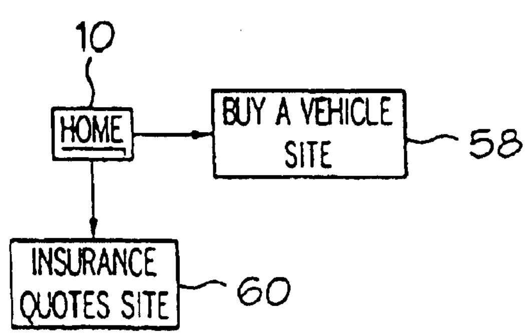
FIG. 3 is a schematic showing optional aspects of the system and method of FIG. 1, namely, connections between the Internet Website at which lease records are displayed and other sites where information concerning vehicle purchasing and vehicle insurance are displayed.

As shown in FIG. 3, the system and method of the present invention provides additional capabilities. For example, from the Home page 10, an individual who decides against assuming a lease, can be linked to a site, represented by page block 58, vehicles are listed for purchase, rather than for lease assumption. In addition, an individual at the Home page 10 can be linked to a site, represented by page block 60, at which information pertaining to insurance quotes can be viewed.

Figure 4:
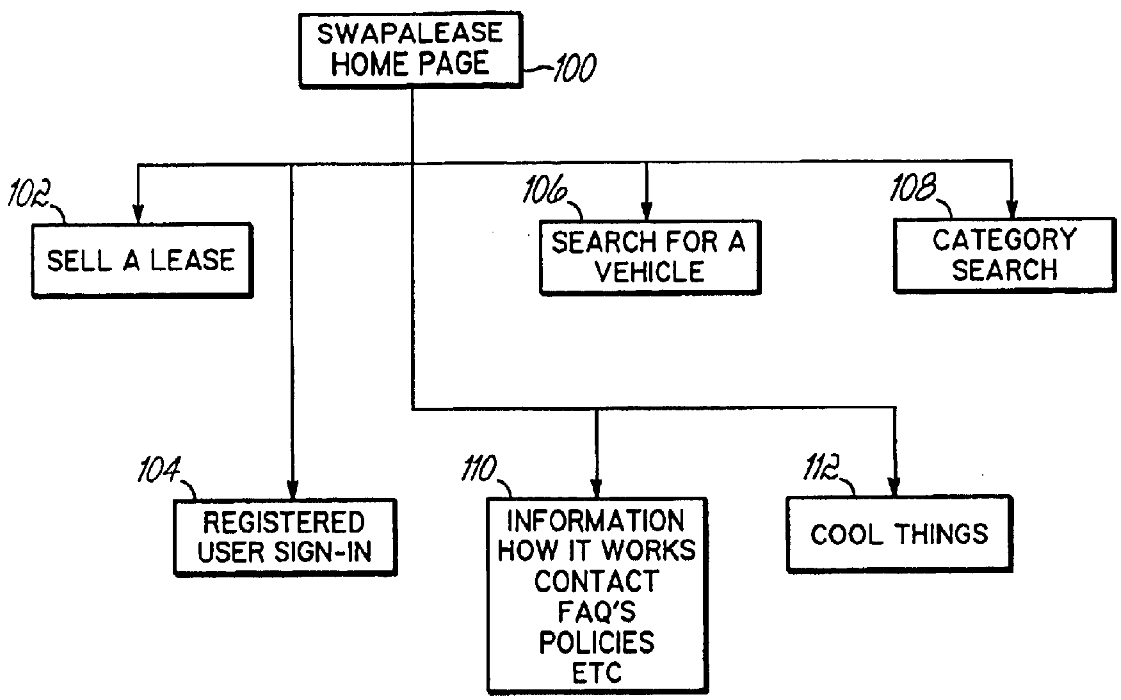
FIG. 4 is a process chart for options from an home page of another embodiment of a leasing system and method.

A second embodiment of a method and system for facilitating transfer of vehicle leases between parties is now described with reference to FIGS. 4–9. FIG. 4 depicts the process options available to a user who has entered the Home page 100 of the lease system web site. Home page 100 provides a user the ability to link to various options of the web site including a sell lease link 102, a registered user sign in link 104, a search for vehicle link 106, a category search link 108, and additional information link 110 and a "cool things" link 112. Of course, other links or options could be provided.

Figure 5:
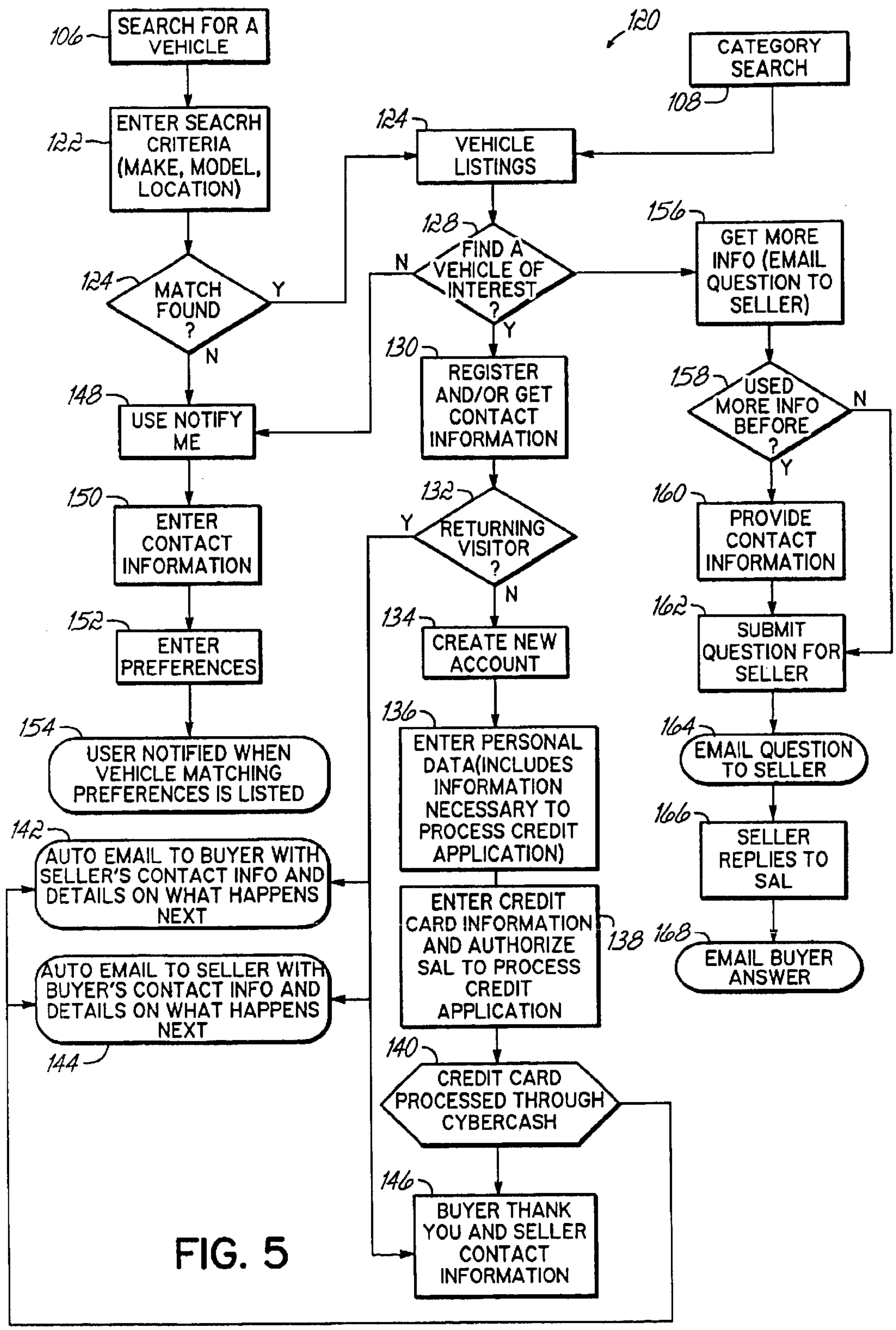
FIG. 5 illustrates a searching user/buyer transaction process.

Referring to FIG. 5, a searching user/buyer process 120 is shown. A user selecting the search for a vehicle link 106 may be taken to a web page or pages 122 where a user can utilize a search engine to enter certain search parameters for the types of vehicles of interest to the searching user. These parameters may, for example, include the city and state of residence of the owner of the vehicle or city and state of vehicle location; the make, model, year, color and number of doors on the vehicle; and/or the desired amount of the monthly vehicle lease payment. Such parameters might be manually entered or could be selected from lists generated on the web page. Of course, other search parameters could be included in a given system. Once the parameters are entered, the search engine conducts a search as indicated at 124 to determine if any vehicle lease records in the vehicle lease record database of the web site meet the criteria entered by the searching user. If so, the searching user may be linked to a web page or pages 126 where the matching vehicle lease records can be viewed. A user who selects the category search link 108 may also be linked to page or pages 126 to view information from vehicle lease records matching the search category. By way of example, possible search categories may include cars, luxury cars, sports cars, SUVs, trucks, vans, all listings, or new listings.

Figure 10:
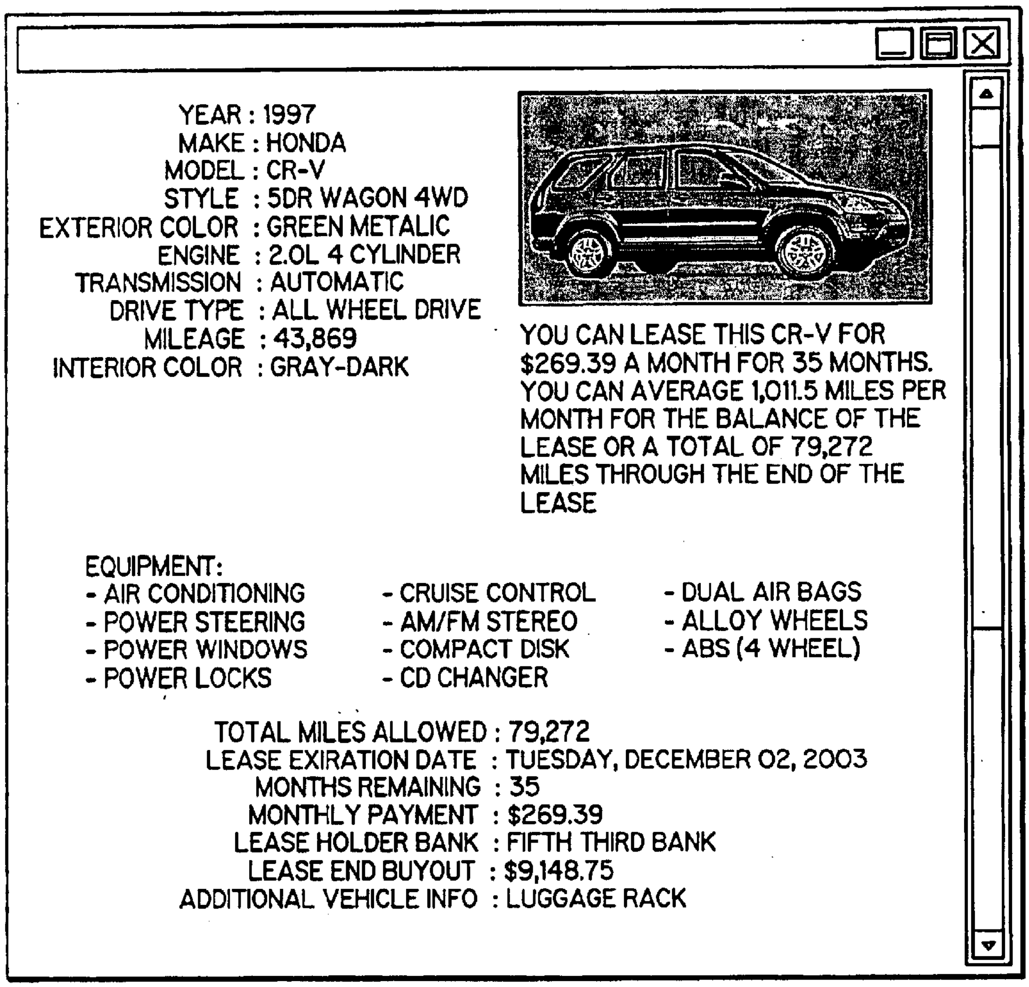
FIG. 10 illustrates an exemplary display of vehicle information.

At 126, in one embodiment the vehicle lease record information may be displayed in a list format, with minimal information being displayed such as the vehicle make and model, the vehicle year, the vehicle style, the monthly lease payment for the vehicle, and the months remaining on the vehicle lease. Each vehicle in the displayed vehicle list may include a link to more detailed information concerning the vehicle and its associated vehicle lease. In this manner, the searching user can make a quick determination of whether or not he/she has interest in any of the listed vehicles, and if so can retrieve additional information using the link provided on the web page. In this regard, the link associated with each displayed vehicle on the list may generate a pop-up window which includes the additional vehicle and vehicle lease information. In one embodiment the information displayed may be in the form shown in FIG. 10 where the vehicle year, make, model, style, exterior color, engine type, transmission type, drive type, mileage, interior color, equipment, total miles allowed on lease, lease expiration date, months remaining, monthly lease payment, leaseholder bank, lease end buyout, and additional vehicle information fields are provided for the searching user. In addition, a vehicle picture may be provided and a summary paragraph defining the vehicle model, lease payment, months remaining, average miles allowed per month and total miles allowed in conjunction with the vehicle lease may also be provided. The web site software may generate this information automatically. Notably, in this embodiment the searching user is not provided with any listing user information which might enable the searching user to contact the listing user.

If a searching user finds a particular vehicle of interest as indicated at 128 in FIG. 5, the searching user may trigger a link to request contact information of the listing user as indicated at 130. At 132, if the searching user is not already a registered user of the site, the searching user is directed to a web page or series of web pages 134, 136, 138 where the searching user can create a new account by entering personal data including, for example, user name information, password information, e-mail information, credit application information, and credit card information. Once the information has been entered, the credit card information may be processed at 142 to charge the searching user a monetary amount to become a registered user of the site. It is contemplated that an automated electronic credit card transaction process may be used. If the credit card transaction clears, the user is added to a registered user data base of the web site and the searching user/buyer is given access to the listing user/seller information for the vehicle of interest at 142. Similarly, the listing user/seller is provided with the searching user/buyer contact information at 144. In one embodiment the listing user and searching user may be provided with such information via automated e-mails. It is also contemplated that the listing user and/or searching user could be provided access to the contact information via a web site page, as indicated at 146. At step 132, if the searching user is already a registered user of the web site steps 134, 136, 138 and 140 may be skipped.

If no matching vehicle lease record is found at step 124, or if no vehicle of interest is identified in step 128, the searching user may elect to use a notify me option 148 of the search engine in which the searching user enters his contact information 150 (preferably at least e-mail information) which is then stored in a database in association with the listing users entered criteria. The search engine automatically searches the vehicle lease record data base on a regular basis in the future to determine whether any newly added vehicle lease records meet the entered criteria of the searching user. If so, an automated e-mail to the searching user may be generated informing the searching user that new vehicles of interest are contained in the vehicle lease database. The e-mail may also include a link to the web page or pages containing information regarding the vehicle or vehicles of interest. After the searching user enters his contact information, the search criteria information may be modified by the user at 152. User notification is illustrated at 154.

Referring again to step 128, for a given vehicle of interest a searching user may also choose to obtain more information regarding the vehicle as indicated at 156. At step 158, if the searching user has not entered contact information previously the information is entered on the web site at 160. Otherwise, at 162 the searching user/buyer enters a question or otherwise requests additional information from the listing user/seller. The information may be entered via a web page entry screen, and then automatically e-mailed on to the listing user/seller at 164, without identifying the searching user to the listing user. The listing user/seller replies to the e-mail at 166 and the reply is automatically forwarded to the searching user/buyer at 168, without identifying the listing user to the searching user.

Figure 6:
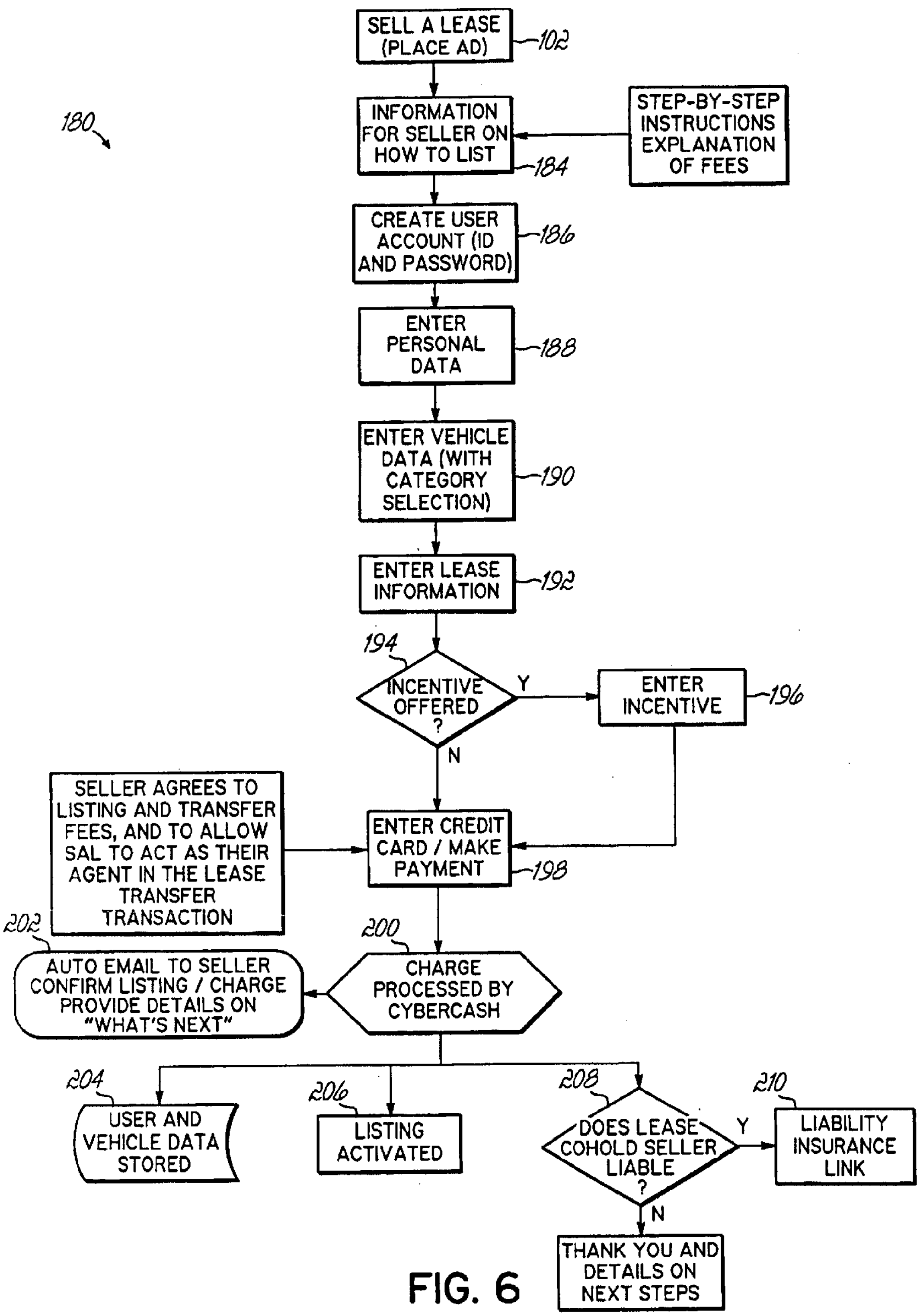
FIG. 6 illustrates a listing user/seller ad placement process.

A listing user/seller add placement process 180 is now described with reference to FIG. 6. From the Home page 100, the listing user selects the sell a lease link 102 and is taken through a series of web pages and/or pop up windows which allow the user to enter appropriate information as needed. As indicated at 184, the listing user may first be provided with information about how the vehicle listing process works. At 186, the listing user either logs in (assuming the listing user is already a registered user and has created an account with the website) or the listing user creates a new account. At this step a previously registered listing user simply enters login information such as a login name and password and is then directed to a screen or page where the listing user can verify the continued accuracy of the listing user's account information. An unregistered listing user may be directed to a series of pages or screens for the entry of required account information including a desired user name and password, legal name, date of birth, social security number, residence address, telephone number, and e-mail address. Once the listing user has either logged in and verified account information or entered new account information at 188, the listing user maybe taken through a series of web-pages or screens 190 which enable the listing user to enter data about the particular vehicle which the listing user intends to list on the website. In one embodiment the listing user may enter the information manually, or in another embodiment the listing user may use an input device such as a mouse to select from options displayed on the web pages. The information typically entered might include the vehicle year, vehicle make, vehicle model, vehicle category, vehicle body style, vehicle engine, vehicle transmission type, vehicle drive system, vehicle mileage, vehicle interior and exterior color, VIN number, vehicle equipment, and additional information or comments the listing user wishes to provide. The listing user may also be provided the ability to upload an image of the vehicle as part of the vehicle listing record, or the listing user may select from a number of stock vehicle images stored in a database on the web site. Alternatively, listing users may be given the option of mailing a vehicle photograph to the website administrator.

Once the vehicle information is entered at 190, the listing user may then be directed to a web page or series of web pages/screens in order to enter vehicle lease information as indicated at 192. The information entered by the listing user may include the vehicle leasing company, the lease account number, the monthly lease payment, the total miles allowed on the lease, the length of the lease term, the lease end buyout amount, the lease origination date and the lease expiration date. After the vehicle lease information has been entered at step 192, the listing user may be given the option of providing an incentive as indicated at step 194. If the listing user chooses to provide an incentive the listing user may be directed to a page or screen where the incentive may be entered as indicated at 196. After entry of the incentive, or if no incentive is to be offered, the listing user enters credit card information at step 198 to pay a required monetary fee in order to have the vehicle listed on the website. At such time the listing user agrees to all listing and transfer fees and also agrees that the website administrator will act as their agent in the lease transfer transaction. At step 200 the electronic credit card transaction is processed and, if approved, an automated e-mail is sent to the listing user/seller to confirm that the vehicle has been listed and to provide details on what may happen next as indicated at step 202. At 204 the vehicle lease record is added to the website database and the listing is activated at 206. Upon successful completion of the electronic credit card transaction the listing user may also be queried as to whether or not the listing user will continue to be held liable to the vehicle leasing company even after transfer of the vehicle lease to another party. This query is shown at 208 and may be in the form of a simple question presented to the listing user. Alternatively, because vehicle leasing companies typically use standardized agreements, the website may store information regarding continued lessee liability after transfer and may automatically determine whether or not the listing user will continue to be held liable. If the listing user will continue to be held liable the listing user may be directed to a liability insurance link 210 where insurance coverage may be obtained to cover the continued liability as will be explained in further detail below.

Figure 7:
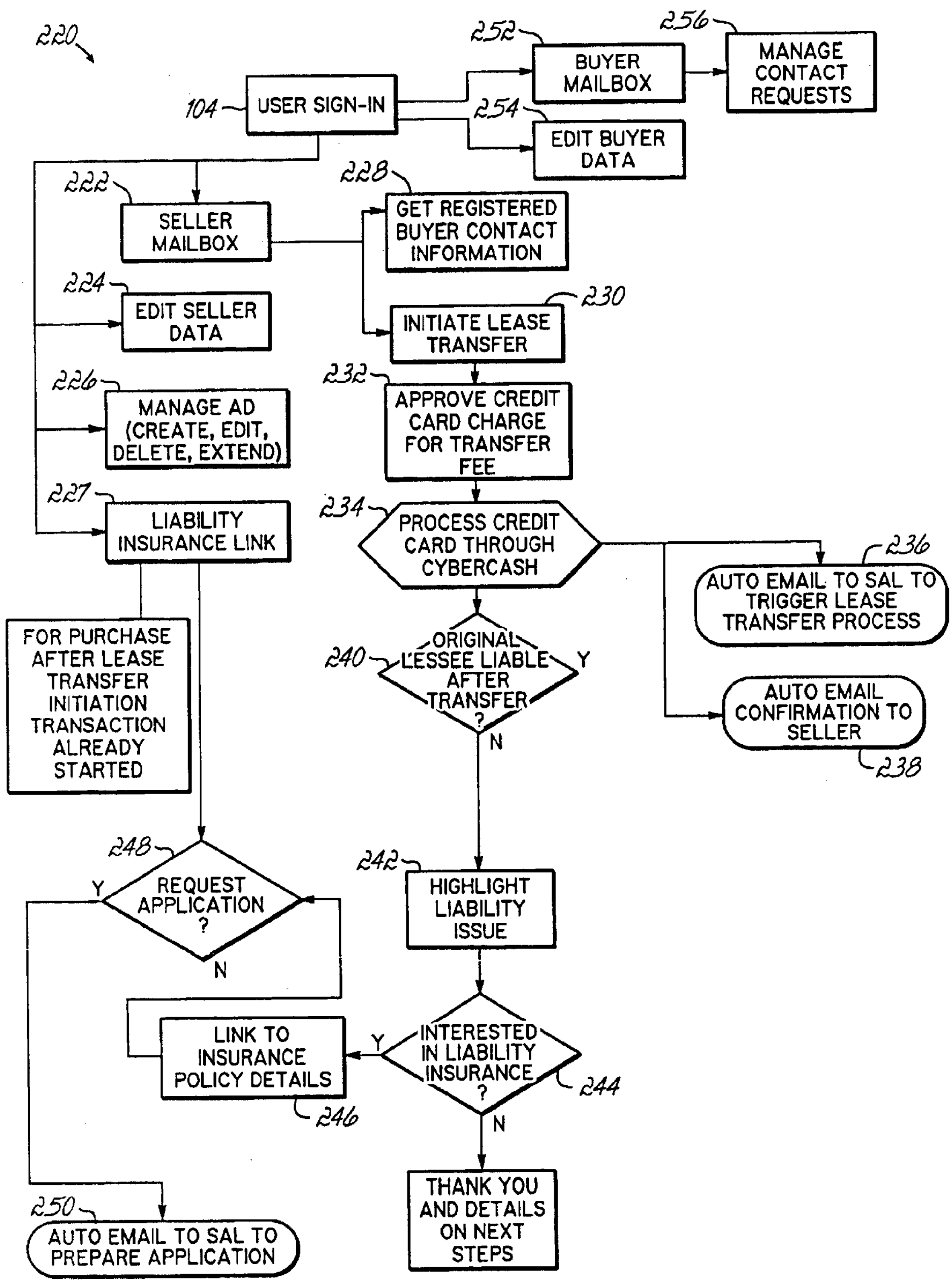
FIG. 7 illustrates an user account management process.

The lease transfer system website may also be set up to allow listing users/sellers and/or searching users/buyers to manage their accounts as will be explained with reference to the process chart 220 of FIG. 7. From the registered users sign in link 104 of the home page a listing user may be provided with options including seller mail box option 222, edit seller data option 224, manage add option 226, and liability insurance link option 210. Via the seller mail box option 222, the listing user may view registered searching user/buyer contact information for any searching user who has indicated an interest in a given vehicle listed by the listing user as indicated at 228. The listing user may also initiate a transfer of a lease for a given vehicle listed by the listing user as indicated at 230. The listing user may be charged a monetary fee via electronic credit card transaction as indicated at 232, 234 in order to initiate the lease transfer. If the credit card transaction is approved an electronic message 236 triggers the website administrator to initiate the lease transfer and an electronic message 238 to the listing user to confirm that the lease transfer process has been initiated. With regard to electronic message 236, where the lease transfer process is wholly automated this electronic message may simply trigger website software to perform the lease transfer process as will be explained below. Alternatively, where one or more of the lease transfer process steps is conducted manually, this electronic message may be an e-mail to the website administrator.

After the electronic credit card transaction is approved at step 234, a determination may be made at step 240 as to whether or not the listing user will remain liable to the vehicle leasing company after transfer of the vehicle lease. This determination may be made as previously described. If so, at step 242 an explanation of the liability issue may be provided to the listing user. If the listing user expresses an interest in liability insurance to cover the continued liability at step 244, the listing user may be directed to a page 246 which explains in detail the coverage available to the listing user through the system. If the listing user chooses to request the insurance at step 248, an electronic message 250 may be generated to initiate the insurance application process. The electronic message 250 may initiate an automated preparation of an insurance application which can be electronically forwarded to the insurance provider for approval, with such approval notification being electronically transmitted back to the website and forwarded on to the listing user. Alternatively, where paper documentation is required the insurance policy application may be generated and forwarded to the listing user for signature, with the application then being forwarded onto the insurance provider.

The edit seller data option 224 enables the seller to edit his account information, such as telephone number, address, e-mail address, etc. The manage add option 226 enables the listing user, via lease action engine software, to create new vehicle lease records, edit existing vehicle lease records, delete existing vehicle lease records, and/or extend the active time period of a given vehicle lease record. In this regard, when a listing user creates a new vehicle lease record it is stored in the vehicle lease database in association with information identifying the listing user. Using option 226 the listing user only has access to edit, delete or to extend vehicle lease records which are associated with the particular listing user (as by login information and name). The extend capability for given vehicle lease records is based upon an embodiment in which the listing user pays a first monetary amount to have a vehicle listed for a set period of time (such as two months), and after that set time the vehicle listing is automatically deactivated. If the listing user has not sold/transferred the vehicle lease by that time, the listing user may select the extend option and pay an additional monetary amount to keep the vehicle listing active on the site for an additional time period.

Liability insurance link 227 enables the listing user to request the liability insurance coverage after the lease transfer has been initiated. For example, where a listing user originally elects not to obtain the liability insurance, and then has a change of heart, the listing user can reenter the system and use link 227 to obtain the liability insurance coverage.

After sign in, a searching user/buyer maybe given various options including a buyer mailbox option 252 and in edit buyer data option 254. Using the buyer mailbox option 252, the searching user may manage the searching users previous contact requests as indicated at 256. For example, the searching user may elect to withdraw a previously indicated interest in a particular vehicle searching. Using the edit data option 254 the searching user may change the contact information stored on the system, such as address, telephone number, e-mail, etc.

Figure 8:
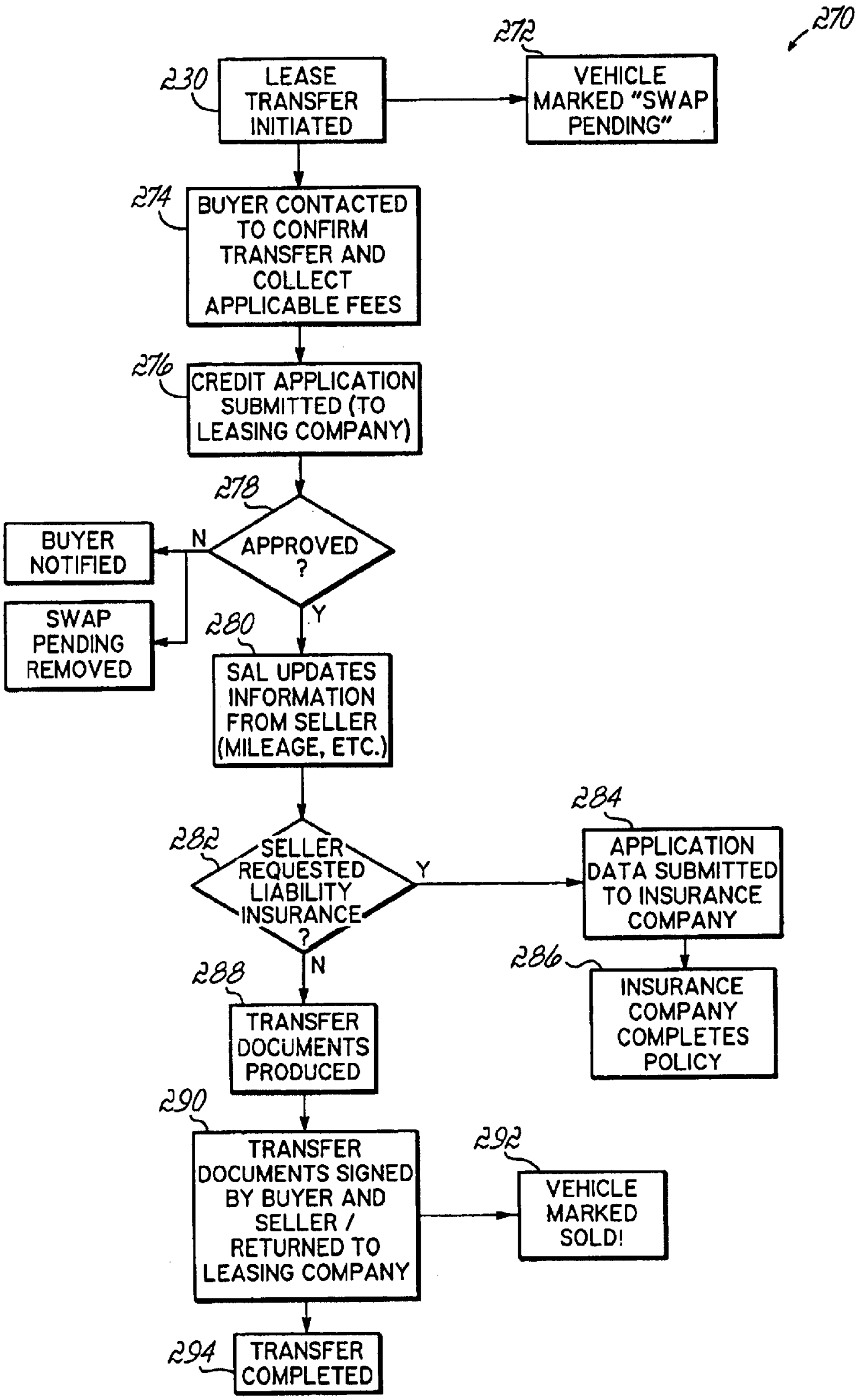
FIG. 8 illustrates a flow diagram of a lease transfer process.

A lease transfer process diagram 270 is shown in FIG. 8. When a listing user initiates a lease transfer at 230, the vehicle lease record is marked as a "swap pending" record in the vehicle lease database at 272. In this manner future searching users viewing information concerning the vehicle associated with the vehicle lease record will be informed that a lease transfer has already been initiated for the vehicle. At step 274 the searching user/buyer is contacted to confirm that it is okay to proceed with the lease transfer. Such contact may be made in an automated electronic manner, such as via e-mail, with the searching user approving the lease transfer by return e-mail or by accessing the website. Various lease transfer fees may also be collected from the searching user/buyer at this time, including any bank related credit application fees, which may be collected via electronic credit card transaction. At step 276 a credit application is prepared for the searching user/buyer and is submitted to the leasing company. The credit application may be generated automatically in electronic format based upon the information that the searching user previously entered in creating the listing user site account, and may be electronically transmitted to the leasing company. It is also possible that the credit application may be printed in hard format and submitted in such format to the leasing company. If the credit application is approved by the leasing company at step 278, as may be indicated by an electronically generated message by the leasing company, the website contacts the listing user/seller at 282 to update necessary information for the lease transfer, primarily the current vehicle mileage. Such contact may be made via telephone, fax, or by an automated e-mail to the listing user which directs the listing user to access the website and enter the required update information.

If the listing user has requested liability insurance as determined at step 282 the insurance application can be submitted to the insurance company at 284 and the insurance company can generate and complete the policy at 286. In one embodiment such application submission and policy generation may be a fully automated electronic process. At step 288 the necessary lease transfer documents are produced using the information which has been previously provided by both the listing user/seller and the searching user/buyer. Such document preparation may be an automated electronic process or may involve some human intervention. The transfer documents are forwarded to the searching user/buyer and the listing user/seller for review and execution and are then returned to the leasing company at step 290. Where the documents are electronically generated they may be electronically forward to the users, via e-mail or via the website, with the users providing electronic approval/signature to the documents. Alternatively hard copies of the documents may be forwarded to the users for manual signature. Similarly, the executed documents may be forwarded electronically to the leasing company, or hard copies of the documents may be forwarded. At step 292 the vehicle record is marked sold in the vehicle lease database so that future searching users will not unnecessarily waste their time by expressing interest in a vehicle which is no longer available. At step 294 the transfer is shown as completed.

Figure 9:
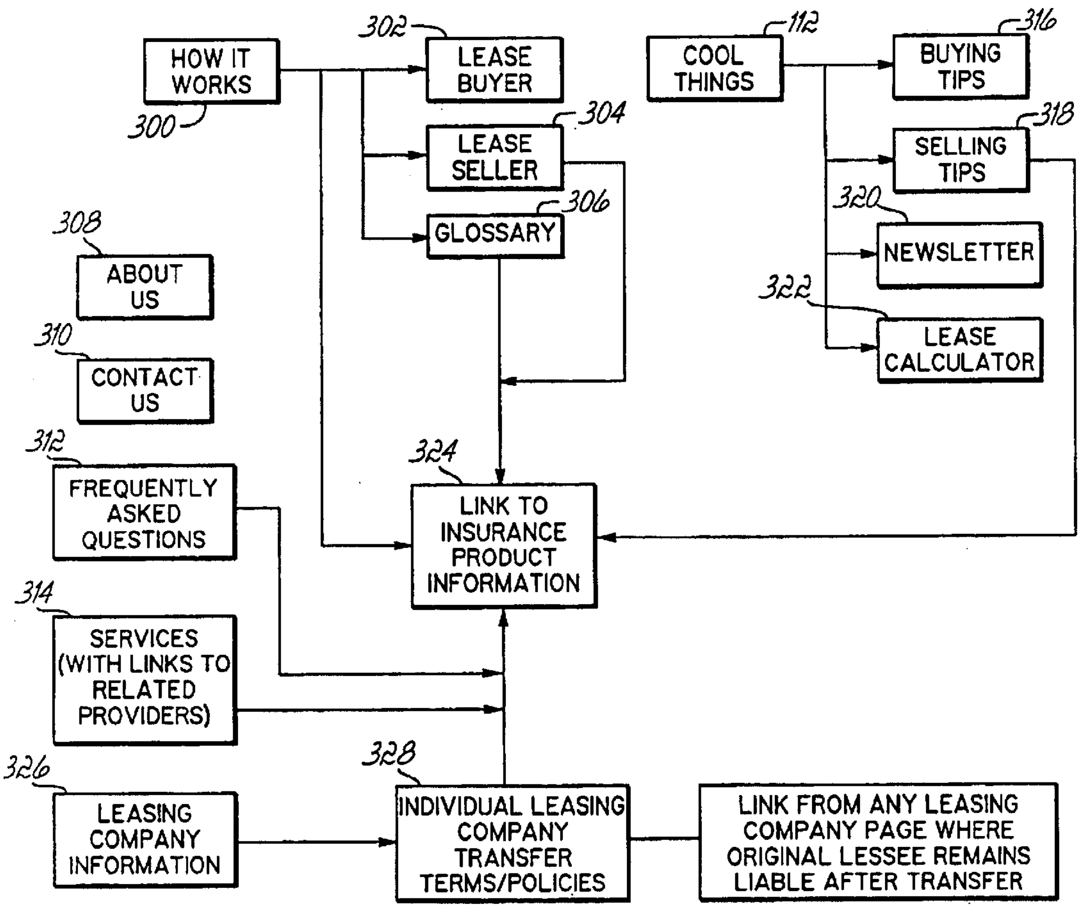
FIG. 9 illustrates additional content options available from the web site.

As shown in FIG. 9, the additional information link 110 of the website homepage 100 may provide the users with various information concerning how the process works, as well as links to other information which may be helpful to the users. For example, a how it works link 300 may provide an explanation of the process which is directed to searching user/buyers at indicated at 302 and may also provide an explanation which is directed to listing users/sellers as indicated at 304. A glossary of various terms may be provided at 306. The link 308 would direct the users to an explanation of the company running the website while link 310 would provide contact information for the website operator. A link to frequently asked questions (and answers to the same) may be provided at 312, and a link which would direct users to related service providers may be provided at 314. The cool things link 112 may be used to direct users to buying tips 316, selling tips 318, a site newsletter 320 and a lease calculator 322. From various locations in this process the users may be directed by link 324 to the insurance product information. Links to particular leasing companies may also be provided as shown at 326 in order to provide both listing users and searching users with information about the particular leasing company associated with a given vehicle lease at 328.

Figure 11:
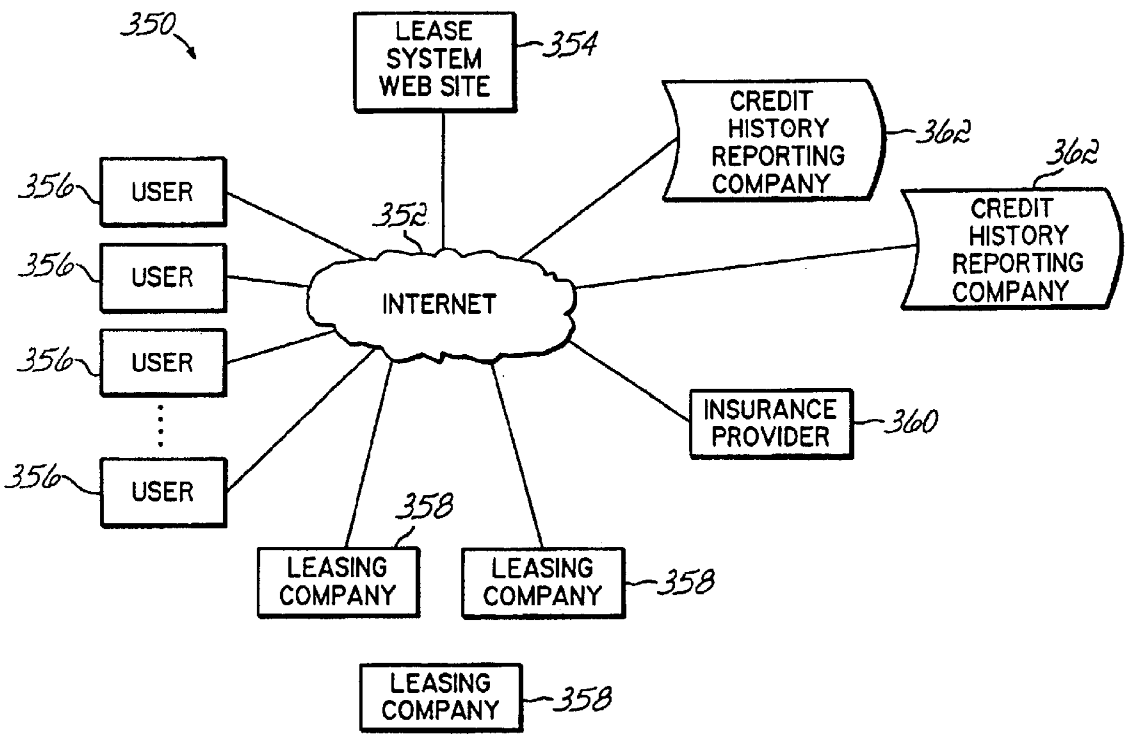
FIG. 11 illustrates an exemplary Internet supported system.

Referring now to FIG. 11 an exemplary system 350 in which communications are provided vice the Internet 352 is shown and includes the lease system web site 354 which may be formed by one or more web serves storing the software and databases used to operate the system as previously described. Multiple users 356 are shown, with their access typically being provided by a personal computer. However, it is recognized that systems in which users access the site 354 using other devices such as personal digital assistants or cell phones could be supported. Leasing company computer systems 358 are shown, along with insurance provider computer system 360 and credit history company computer systems 362.

Although the invention has been described above in detail referencing the preferred embodiments thereof, it is recognized that various changes and modifications could be made without departing from the spirit and scope of the invention.

What is claimed is:

1. A method for facilitating the transfer of vehicle leases between parties, the method comprising the steps of:

providing a website which displays at least one control giving a visitor an option of (A) creating a record including details of the visitor and of a leased vehicle whose lease the first visitor intends to assign, and (B) viewing a list of records, each record including a description of a leased vehicle and an owner thereof;

in response to a first, listing user visiting the website and selecting option (A):

directing the listing user to a first webpage at the website;

receiving from the listing user at said first webpage information pertaining to a leased vehicle and information to enable another visitor to the website to contact the listing user, wherein the information input by the listing user includes an incentive amount offered by the listing user to encourage another visitor to assume the lease; and storing the record created by the listing user in a database;

in response to a second, searching user visiting the website and selecting option (B):

directing the searching user to a second webpage at the website;

providing the searching user access to a database of vehicle lease records at the second webpage concerning vehicle leases available for transfer;

searching, via a search engine, the vehicle lease database according to criteria entered by the searching user, whereby the search engine identifies available vehicle lease records which meet the entered criteria; and upon execution of a given search, via the search engine, providing to the searching user information from matching vehicle lease records which meet the entered criteria of the given search, the information including at least one of incentive amount, allowed lease mileage, lease payment amount, lease mileage amount, lease holder, lease end buyout amount, months remaining on lease, and available miles per month remaining on the lease; and receiving financial information from the searching user for use in connection with initiating a lease transfer of a selected vehicle, said selected vehicle associated with a selected vehicle lease record, such that the searching user can thereafter assume the selected vehicle's lease associated with the selected vehicle lease record.

2. The method of claim 1 comprising the further steps of:

providing a lease action engine for modifying the vehicle lease database; providing controlled access to the lease action engine; and upon addition of a vehicle lease record to the vehicle lease database by the listing user via the lease action engine, associating the entered vehicle lease record of the vehicle lease database with the listing user.

3. The method of claim 2, comprising the further steps of:

prior to enabling the listing user to add a vehicle lease record to the vehicle lease database via the lease action engine, requiring the listing user to become a registered user by at least entering listing user identifying information.

4. The method of claim 3, comprising the further step of:

via the lease action engine, enabling the listing user to delete or modify an existing vehicle lease record of the vehicle lease database only if the existing vehicle lease record is associated with the listing user.

5. The method of claim 4, comprising the further steps of:

obtaining identifying information from any searching user interested in contacting the listing user about a given vehicle lease record; and providing the listing user access to a mailbox of searching user identifying information concerning searching user interest in at least one vehicle lease record associated with the listing user.

6. The method of claim 4 wherein entered vehicle lease records are associated with listing users via entered password information.

7. The method of claim 2, comprising the further steps of:

requiring the listing user to pay a first monetary fee for adding a vehicle lease record to the vehicle lease database;

maintaining the vehicle lease record in the vehicle lease database and accessible by the search engine for a set time period; and requiring the listing user to pay a second monetary fee in order to extend the set time period.

8. The method of claim 7 wherein monetary payments are made via electronic credit card transactions.

9. The method of claim 1, comprising the further step of:

permitting the searching user access to the search engine without requiring that the searching user pay any monetary fee.

10. The method of claim 9, comprising the further step of:

initially limiting information available to the searching user concerning the matching vehicle lease record; and requiring the searching user to pay a monetary fee in order to obtain listing user contact information for the matching lease record.

11. The method of claim 10 comprising the further steps of prior to the searching user paying the monetary fee, enabling the searching user to enter questions seeking additional information regarding the vehicle of the matching vehicles lease record;

electronically forwarding entered searching user questions to the listing user without identifying the searching user to the listing user; and electronically forwarding listing user responses to the searching user without identifying the listing user to the searching user.

12. The method of claim 1 comprising the further steps of:

prior to the searching user being provided with identifying information for the listing user that would enable the searching user to contact the listing user directly, enabling the searching user to enter questions seeking additional information regarding the vehicle of the matching vehicles lease record;

electronically forwarding entered searching user questions to the listing user; and electronically forwarding listing user responses to the searching user.

13. The method of claim 12, wherein electronically forwarding entered searching user questions to the listing user is performed without providing sufficient searching user identifying information that would enable the listing user to contact the searching user directly, and wherein electronically forwarding listing user responses to the searching user is performed without providing sufficient listing user identifying information that would enable the searching user to contact the listing user directly.

14. The method of claim 1, wherein receiving the financial information comprises receiving credit application information from the searching user.

15. The method of claim 14, wherein receiving credit application information is performed via searching user input to a credit application webpage.

16. The method of claim 14, comprising the further step of:

generating an electronic credit application from the credit application information and forwarding the electronic credit application to at least one credit provider.

17. The method of claim 16, wherein the credit provider is a lessor associated with the given vehicle lease record.

18. The method of claim 16, comprising the further step of:

upon receipt of approval/denial status of the submitted electronic credit application, electronically notifying both the searching user and the listing user of the approval/denial status.

19. The method of claim 14, wherein receiving the credit application information includes receiving the credit application information in electronic format and forwarding the credit application to at least one credit provider to obtain preapproval for the searching user prior to the searching user selecting the selected vehicle for a lease transfer.

20. The method of claim 1, comprising the further step of:

enabling at least one of the searching and listing users to electronically initiate a lease transfer of a vehicle lease associated with a given vehicle lease record.

21. The method of claim 20, comprising the further steps of:

producing vehicle lease transfer documents and forwarding the documents to the listing user and the searching user for signature; and forwarding the signed lease transfer documents to a leasing company.

22. The method of claim 20 comprising the further step of:

requiring the listing user to pay a monetary fee to initiate the lease transfer.

23. The method of claim 20, comprising the further steps of:

marking the given vehicle lease record as in a transfer pending state; and displaying the transfer pending state of the given vehicle lease record to subsequent searching users.

24. The method of claim 1, comprising the further steps of:

enabling the listing user to electronically request insurance for coverage of vehicle liability retained by the listing user even after transfer of the vehicle lease.

25. The method of claim 24, comprising the further steps of preparing an insurance application in response to the listing user request; and submitting the insurance application to an insurance provider for approval.

26. The method of claim 1 comprising the further step of:

in the event that no current vehicle lease record in the vehicle lease database meets the entered criteria of the searching user's executed search at the time of execution:

obtaining searching user identifying information including at least an e-mail address;

storing such information in association with the entered criteria of the searching user's executed search;

subsequently conducting an automated search of the vehicle lease database for vehicle lease records meeting the entered criteria of the searching user's executed search; and if the automated search identifies at least one vehicle lease record meeting the entered criteria of the searching user's executed search, notifying the searching user via e-mail that a matching vehicle lease record exists in the vehicle lease database.

27. The method of claim 1 wherein a multiplicity of the vehicle lease records each includes information identifying at least vehicle make, vehicle model, vehicle year, vehicle mileage, allowed lease mileage, lease payment amount, lease mileage amount, lease holder, and lease end buyout amount.

28. The method of claim 1 wherein the information provided to the searching user includes the vehicle make, vehicle model, vehicle year, vehicle mileage, allowed lease mileage, lease payment amount, lease mileage amount, lease holder, lease end buyout amount, months remaining on lease, and available miles per month remaining on the lease.

29. An apparatus, comprising:

at least one processor; and program code configured to execute on the at least one processor, the program code configured to facilitate the transfer of vehicle leases between parties by:

providing a website which displays at least one control giving a visitor an option of (A) creating a record including details of the visitor and of a leased vehicle whose lease the first visitor intends to assign, and (B) viewing a list of records, each record including a description of a leased vehicle and an owner thereof;

in response to a first, listing user visiting the website and selecting option (A):

directing the listing user to a first webpage at the website;

receiving from the listing user at said first webpage information pertaining to a leased vehicle and information to enable another visitor to the website to contact the listing user, wherein the information input by the listing user includes an incentive amount offered by the listing user to encourage another visitor to assume the lease; and storing the record created by the listing user in a database;

in response to a second, searching user visiting the website and selecting option (B):

directing the searching user to a second webpage at the website;

providing the searching user access to a database of vehicle lease records at the second webpage concerning vehicle leases available for transfer;

searching, via a search engine, the vehicle lease database according to criteria entered by the searching user, whereby the search engine identifies available vehicle lease records which meet the entered criteria; and upon execution of a given search, via the search engine, providing to the searching user information from matching vehicle lease records which meet the entered criteria of the given search, the information including at least one of incentive amount, allowed lease mileage, lease payment amount, lease mileage amount, lease holder, lease end buyout amount, months remaining on lease, and available miles per month remaining on the lease; and receiving financial information from the searching user for use in connection with initiating a lease transfer of a selected vehicle, said selected vehicle associated with a selected vehicle lease record, such that the searching user can thereafter assume the selected vehicle's lease associated with the selected vehicle lease record.

30. The apparatus of claim 29, wherein the program code is further configured to:

obtain identifying information from any searching user interested in contacting the listing user about a given vehicle lease record; and provide the listing user access to a mailbox of searching user identifying information concerning searching user interest in at least one vehicle lease record associated with the listing user.

31. The apparatus of claim 29, wherein the program code is further configured to:

require the listing user to pay a first monetary fee for adding a vehicle lease record to the vehicle lease database;

maintain the vehicle lease record in the vehicle lease database and accessible by the search engine for a set time period; and require the listing user to pay a second monetary fee in order to extend the set time period.

32. The apparatus of claim 29, wherein the program code is further configured to:

permit the searching user access to the search engine without requiring that the searching user pay any monetary fee;

initially limit information available to the searching user concerning the matching vehicle lease record; and require the searching user to pay a monetary fee in order to obtain listing user contact information for the matching lease record.

33. The apparatus of claim 32, wherein the program code is further configured to:

prior to the searching user paying the monetary fee, enable the searching user to enter questions seeking additional information regarding the vehicle of the matching vehicles lease record;

electronically forward entered searching user questions to the listing user without identifying the searching user to the listing user; and electronically forward listing user responses to the searching user without identifying the listing user to the searching user.

34. The apparatus of claim 29, wherein the program code is further configured to:

prior to the searching user being provided with identifying information for the listing user that would enable the searching user to contact the listing user directly, enable the searching user to enter questions seeking additional information regarding the vehicle of the matching vehicles lease record;

electronically forward entered searching user questions to the listing user; and electronically forward listing user responses to the searching user.

35. The apparatus of claim 34, wherein the program code is configured to electronically forward entered searching user questions to the listing user without providing sufficient searching user identifying information that would enable the listing user to contact the searching user directly, and to electronically forward listing user responses to the searching user without providing sufficient listing user identifying information that would enable the searching user to contact the listing user directly.

36. The apparatus of claim 29, wherein the program code is configured to receive the financial information by receiving credit application information from the searching user.

37. The apparatus of claim 36, wherein the program code is configured to receive credit application information via searching user input to a credit application webpage, and wherein the program code is further configured to generate an electronic credit application from the credit application information and forward the electronic credit application to at least one credit provider.

38. The apparatus of claim 36, wherein the program code is configured to receive the credit application information in electronic format and forward the credit application to at least one credit provider to obtain preapproval for the searching user prior to the searching user selecting the selected vehicle for a lease transfer.

39. The apparatus of claim 29, wherein the program code is further configured to:

enable at least one of the searching and listing users to electronically initiate a lease transfer of a vehicle lease associated with a given vehicle lease record.

40. The apparatus of claim 39, wherein the program code is further configured to:

produce vehicle lease transfer documents and forward the documents to the listing user and the searching user for signature; and forward the signed lease transfer documents to a leasing company.

41. The apparatus of claim 29, wherein the program code is further configured to:

enable the listing user to electronically request insurance for coverage of vehicle liability retained by the listing user even after transfer of the vehicle lease.

42. The apparatus of claim 29, wherein the program code is further configured to, in the event that no current vehicle lease record in the vehicle lease database meets the entered criteria of the searching user's executed search at the time of execution:

obtain searching user identifying information including at least an e-mail address;

store such information in association with the entered criteria of the searching user's executed search;

subsequently conduct an automated search of the vehicle lease database for vehicle lease records meeting the entered criteria of the searching user's executed search; and if the automated search identifies at least one vehicle lease record meeting the entered criteria of the searching user's executed search, notify the searching user via e-mail that a matching vehicle lease record exists in the vehicle lease database.

43. A program product, comprising:

a computer readable storage medium; and program code stored on the computer readable storage medium and configured to facilitate the transfer of vehicle leases between parties by:

providing a website which displays at least one control giving a visitor an option of (A) creating a record including details of the visitor and of a leased vehicle whose lease the first visitor intends to assign, and (B) viewing a list of records, each record including a description of a leased vehicle and an owner thereof;

in response to a first, listing user visiting the website and selecting option (A):

directing the listing user to a first webpage at the website;

receiving from the listing user at said first webpage information pertaining to a leased vehicle and information to enable another visitor to the website to contact the listing user, wherein the information input by the listing user includes an incentive amount offered by the listing user to encourage another visitor to assume the lease; and storing the record created by the listing user in a database;

in response to a second, searching user visiting the website and selecting option (B):

directing the searching user to a second webpage at the website;

providing the searching user access to a database of vehicle lease records at the second webpage concerning vehicle leases available for transfer;

searching, via a search engine, the vehicle lease database according to criteria entered by the searching user, whereby the search engine identifies available vehicle lease records which meet the entered criteria; and upon execution of a given search, via the search engine, providing to the searching user information from matching vehicle lease records which meet the entered criteria of the given search, the information including at least one of incentive amount, allowed lease mileage, lease payment amount, lease mileage amount, lease holder, lease end buyout amount, months remaining on lease, and available miles per month remaining on the lease; and receiving financial information from the searching user for use in connection with initiating a lease transfer of a selected vehicle, said selected vehicle associated with a selected vehicle lease record, such that the searching user can thereafter assume the selected vehicle's lease associated with the selected vehicle lease record.

* * * * *

UNITED STATES PATENT AND TRADEMARK OFFICE

CERTIFICATE OF CORRECTION

PATENT NO. : 6,965,874 B2
APPLICATION NO. : 09/775002
DATED : November 15, 2005
INVENTOR(S) : Ron Joseph It is certified that error appears in the above-identified patent and that said Letters Patent is hereby corrected as shown below:

Column 3

Lines 6 and 12, please delete “an” and insert --a-- therefor.

Line 43, please delete ““LEASE”)” and insert --(“LEASE”)-- therefor.

Line 63, please delete “LESES” and insert --LEASES-- therefor.

Column 4

Line 37, please delete “than” and insert --then-- therefor.

Column 5

Line 41, please delete the comma after the word “lease”.

Line 42, between “58,” and “vehicles” please insert the word --where--, and delete the comma after “purchase”.

Column 7

Line 12, please delete “users” and insert --user’s-- therefor.

Line 39, please delete “add” and insert --ad-- therefor.

Line 60, please delete “maybe” and insert --may be-- therefor.

Column 8

Line 56, please delete “users” and insert --user’s-- therefor.

Line 59, please delete “add” and insert --ad-- therefor.

Column 9

Line 37, please delete “add” and insert --ad-- therefor.

Line 64, please delete “maybe” and insert --may be--therefor.

UNITED STATES PATENT AND TRADEMARK OFFICE

CERTIFICATE OF CORRECTION

PATENT NO. : 6,965,874 B2

APPLICATION NO. : 09/775002

DATED : November 15, 2005

INVENTOR(S) : Ron Joseph

It is certified that error appears in the above-identified patent and that said Letters Patent is hereby corrected as shown below:

Column 10

Line 54, please delete “forward” and insert --forwarded-- therefor.

Column 11

Line 5, please delete “at” and insert --as-- therefor.

Line 23, please delete “vice” and insert --via-- therefor.

Line 25, please delete “serves” and insert --servers-- therefor.

Column 13

Lines 12 and 25, please delete “vehicles” and insert --vehicle’s-- therefor.

Column 14

Line 23, after “of”, please insert a colon.

Column 16

Lines 11 and 25, please delete “vehicles” and insert --vehicle’s-- therefor.

Signed and Sealed this

Eighth Day of August, 2006

JON W. DUDAS

*Director of the United States Patent and Trademark Office*

UNITED STATES PATENT AND TRADEMARK OFFICE

CERTIFICATE OF CORRECTION

PATENT NO. : 6,965,874 B2
APPLICATION NO. : 09/775002
DATED : November 15, 2005
INVENTOR(S) : Ron Joseph It is certified that error appears in the above-identified patent and that said Letters Patent is hereby corrected as shown below:

Title Page; item (76);

In page 1, line 5, "Ron Joseph" should read --Ronald G. Joseph Jr.--.

Signed and Sealed this

Second Day of September, 2008

JON W. DUDAS
*Director of the United States Patent and Trademark Office*

US006965874C1

(12) INTER PARTES REEXAMINATION CERTIFICATE (0291st)

United States Patent

Joseph

(10) Number: US 6,965,874 C1

(45) Certificate Issued: Aug. 16, 2011

(54) METHOD, APPARATUS AND PROGRAM PRODUCT FOR FACILITATING TRANSFER OF VEHICLE LEASES

(75) Inventor: Ron Joseph, Cincinnati, OH (US)

(73) Assignee: Swapalease, Inc., Cincinnati, OH (US)

Reexamination Request:

No. 95/000,379, Nov. 7, 2008

Reexamination Certificate for:

| | |
|---|---|
| Patent No.: | **6,965,874** |
| Issued: | **Nov. 15, 2005** |
| Appl. No.: | **09/775,002** |
| Filed: | **Feb. 1, 2001** |

Certificate of Correction issued Aug. 8, 2006.

Certificate of Correction issued Sep. 2, 2008.

Related U.S. Application Data

(60) Provisional application No. 60/180,264, filed on Feb. 4, 2000.

(51) Int. Cl.
*G06Q 30/00* (2006.01)

(52) U.S. Cl. .................................................... 705/26.62

(58) Field of Classification Search ........................ None
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |
| 4,789,928 | A | 12/1988 | Fujisaki |
| 4,992,940 | A | 2/1991 | Dworkin |
| 5,063,507 | A | 11/1991 | Lindsey et al. |
| 5,262,942 | A | 11/1993 | Earle |
| 5,283,731 | A | 2/1994 | Lalonde et al. |
| 5,319,542 | A | 6/1994 | King, Jr. et al. |
| 5,493,490 | A | 2/1996 | Johnson |
| 5,500,793 | A | 3/1996 | Deming, Jr. et al. |
| 5,513,329 | A | 4/1996 | Pecone |
| 5,664,115 | A | 9/1997 | Fraser |
| 5,715,402 | A | 2/1998 | Popolo |
| 5,732,400 | A | 3/1998 | Mandler et al. |
| 5,774,873 | A | 6/1998 | Berent et al. |
| 5,774,883 | A | 6/1998 | Andersen et al. |
| 5,842,178 | A | 11/1998 | Giovannoli |
| 5,845,265 | A | 12/1998 | Woolston |
| 5,870,717 | A | 2/1999 | Wiecha |
| 5,878,403 | A | 3/1999 | DeFrancesco et al. |

(Continued)

FOREIGN PATENT DOCUMENTS

| | | |
|---|---|---|
| JP | 406036101 | 2/1994 |
| WO | WO 9812656 | 3/1998 |

OTHER PUBLICATIONS

U.S. Appl. No. 60/228,984, filed Aug. 2000, Stiberman, Sergio.*

"Automotive Matchmakers Find Boom in Time of Bust," published in Toronto Star on Jan. 14, 1991.

"Web by Design—The Complete Guide", 1998—Bates Nos. 0001-9.

(Continued)

*Primary Examiner*—Glenn K. Dawson

(57) ABSTRACT

A method for facilitating transfer of vehicle leases between parties involves providing a database of vehicle lease records concerning vehicle leases available for transfer. A search engine is provided for searching the vehicle lease database according to entered criteria, the search engine operable to identify available vehicle lease records which meet the entered criteria. Access to the search engine is provided via a computer network. Upon execution of a given search including criteria entered by a searching user, the searching user is provided, via the computer network, with vehicle lease information concerning at least one matching vehicle lease record which meets the entered criteria of the given search, if such a matching vehicle lease record exists.

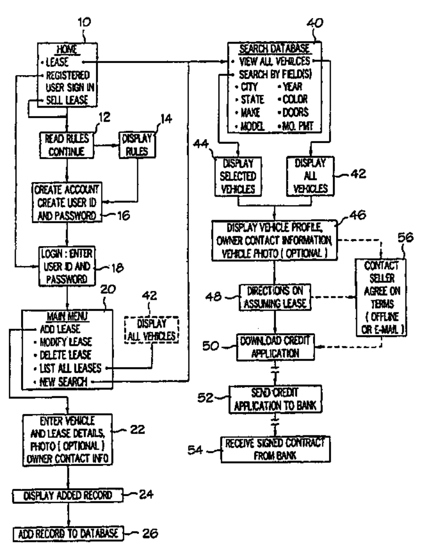

U.S. PATENT DOCUMENTS

| | | | |
|---|---|---|---|
| 5,884,270 A | 3/1999 | Walker et al. | |
| 5,897,622 A | 4/1999 | Blinn et al. | |
| 5,950,178 A | 9/1999 | Borgato | |
| 6,006,201 A | 12/1999 | Berent et al. | |
| 6,023,687 A | 2/2000 | Weatherly et al. | |
| 6,041,310 A | 3/2000 | Green et al. | |
| 6,055,513 A | 4/2000 | Katz et al. | |
| 6,058,373 A | 5/2000 | Blinn et al. | |
| 6,061,789 A | 5/2000 | Hauser | |
| 6,070,149 A | 5/2000 | Tavor et al. | |
| 6,088,683 A | 7/2000 | Jalili | |
| 6,185,683 B1 | 2/2001 | Ginter et al. | |
| 6,237,009 B1 | 5/2001 | Waldo et al. | |
| 6,317,728 B1 | 11/2001 | Kane | |
| 6,381,582 B1 | 4/2002 | Walker et al. | |
| 6,502,080 B1 | 12/2002 | Eichorst et al. | |
| 6,553,347 B1 | 4/2003 | Tavor | |
| 6,735,573 B1 | 5/2004 | Gelman et al. | |
| 6,941,339 B1 | 9/2005 | McMichael | |
| 6,993,511 B2 | 1/2006 | Himmelstein | |
| 7,085,735 B1 | 8/2006 | Hall et al. | |
| 7,103,568 B1 | 9/2006 | Fusz et al. | |
| 7,587,370 B2 | 9/2009 | Himmelstein | |
| 2001/0034689 A1 | 10/2001 | Heilman | |
| 2002/0032626 A1 | 3/2002 | DeWolf et al. | |
| 2002/0052778 A1 | 5/2002 | Murphy et al. | |
| 2002/0099618 A1 * | 7/2002 | Stiberman | 705/26 |

OTHER PUBLICATIONS www.traderonline.com from web.petabox.bibalex.org, web.archive.org—Nov. 15, 1997–Feb. 2, 1999, 6 pgs.

www.vettefinders.com from web.petabox.bibalex.org—Apr. 14, 1997–May 8, 1999, 19 pgs.

www.traderonline.com (Auto Trader Online) from web. archive.org, Dec. 10, 1997–Jan. 20, 1998, 6 pgs.

www.ebay.com from web.petabox.org—Jan. 17, 1999–May 8, 1999,—63 pgs.

www.progressive.com from web.archive.org, Jan. 16, 1998, 1 pg.

Robert Brehl, Automotive Matchmakers Find Boom In Time of Bust, The Toronto Star, Jan. 14, 1991. (2 pages).

Denyse O'Leary, Bank Loan 'Cheaper than Lease', The Toronto Star, May 13, 1995. (2 pages).

Molly E. Holzschlag, Web By Design, The Complete Guide, 1998, pp. 161, 732–733, 737–738, and 753–754, Sybex Inc., Alameda, CA, USA. Appendix M approximately Bates 1–9. (9 pages).

Timothy C. Barmann, Would You Buy a New Car From This Web? Steer Your Browser to a Few Sites and You Can Pick Up Some Information—or Even a Set of Real Wheels, The Philadelphia Inquirer, Apr. 4, 1996. (4 pages).

Barbara K. Kaye and Norman J. Medoff, The World Wide Web, 1999, pp. v, 278–283, Mayfield Publishing Company, Mountain View, CA, USA. (10 pages).

Barbara K. Kaye and Norman J. Medoff, The World Wide Web, 1999, Cover Page, Mayfield Publishing Company, Mountain View, CA, USA. (1 page).

Stephanie Stoughton, Car Shopping Goes Online in Norfolk, VA., Area, The Virginian–Pilot, Oct. 24, 1996. Appendix M approximately Bates 27–29. (3 pages).

Thomas Hoffman, Online Loans for Online Auto Buyers, Computerworld, Oct. 21, 1996, vol. 30, Issue 43, CW Publishing Inc. Appendix M approximately Bates 24–26. (3 pages).

Various pages, www.Stoneage.com, 1998, 5 pages. Appendix M approximately Bates 30–34. (5 pages).

Manufacturer Lease Offers, www.intellichoice.com, Nov. 7, 1996. (2 pages).

Various pages, www.trader.com, 1998. (Also includes waybackmachine.com results). Appendix M approximately Bates43–45. (3 pages).

Various pages, http://autolease.com, Motor Werks, 1997. (Also includes waybackmachine.com results). Appendix M approximately Bates 231–238. (13 pages).

Various pages, www.vettefinders.com, 1997–1999. (Also includes waybackmachine.com results). Appendix M approximately Bates 46–64. (19 pages).

Satisfied AutoWeb Interactive Customers Discover That Online Car Buying Is a Great Way to Purchase a Vehicle, Business Wire, Sep. 30, 1997, Santa Clara, CA, USA. Appendix M approximately Bates 65–67. (3 pages).

Various pages, www.autoweb.com, Auto Web Interactive, 1996–1997. (13 pages).

Various pages, www.autoweb.com, About Our Services, 1996–1997. (22 pages.)

Various pages, www.autoweb.com, Jan. 6, 1997. Appendix M approximately Bates 00221–00229. (9 pages).

Various pages, www.apartments.com, 1998–1999. (5 pages).

Various pages, www.ebay.com, 1999. Appendix M approximately Bates 88–150. (63 pages).

Various pages, www.monster.com, 1996–1999. Appendix M approximately Bates 151–165. (15 pages).

Various pages, www.dreamleases.com, 1999–2000. (7 pages).

Misc. Classifieds, Various Dates. (9 pages).

Lineback Enterprises, Three Steps to Online Auto Leasing, 1991. (4 pages).

Various pages, Internet Archive, http://www.lineback.com, Nov. 1998. (8 pages).

Various pages, Internet Archive, http://www.leasesource.com, 1999–2000. (4 pages).

Various pages, Internet Archive, http://www.autoleasco.com, Feb. 1999. (3 pages).

Shelby Gilje, Transferring Your Car Payments? Take Heed, Seattle times, Seattle, Washington, Jun. 11, 1989. (5 pages).

Various pages, www.autofinder.com, 1996–1997. Appendix M approximately Bates 0185–190. (6 pages).

Apartment Guide, www.apartmentguide.com, May 3, 1999. (1 page).

Change my Ads, www.classfieds2000.com, Jan. 6, 1997. Appendix M approximately Bates 00230. (2 pages).

Various pages, www.classifieds2000.com, 1997–2000. Appendix M approximately Bates 214–220. (7 pages).

LeadingAutomotive Information Web Sites and Supplilers to improve Car–Selling on the Internet With Common Communications Standard, PressPass, Feb. 6, 1999, Microsoft, San Francisco, CA, USA. Appendix M approximately Bates 35–36 (2 pages).

Various pages, www.classmates.com, 1997. (6 pages).

Preapproved Mortgages Are Attracting Buyers; Loans Help House Hunters in Hot Markets, The Washington Post, Sep. 10, 1988. (3 pages).

Donna Harris, Surfing for credit:GMAC leads charge by captives to offer online financing to consumers. (General Motors Acceptance Corp), Automotive News, Mar. 23, 1998. Appendix M approximately Bates 175–178. (4 pages).

Rates page, www.progressive.com/rates, Jan. 16, 1998. (1 page).

Various pages, www.geico.com, 1997. (5 pages).
Auto Trader Online, www.traderonline.com, 1997–1998. Appendix M approximately Bates 68–73. (6 pages).
Various pages, www.traderonline.com, 1997. (Also includes waybackmachine.com results). Appendix M approximately Bates 37–42. (12 pages).
Various pages, www.bostonapartments.com, 1997–1999. Appendix M approximately Bates 74–87. (13 pages).
Various pages, www.leasetrader.com, Search results from web.archive.org (waybackmachine), 2001. (9 pages).
Search page, www.sellyourlease.com, Search results from web.archive.org (waybackmachine). (1 page).
Various pages, www.dreamlease.com, Search results from web.archive.org (waybackmachine) 2000–2001. (6 pages).
Office Action for U.S. Appl. No. 11/089,610 dated Jun. 18, 2008. (17 pages).
Office Action for U.S. Appl. No. 09/775,002 dated Mar. 26, 2003. (6 pages).
Office Action for U.S. Appl. No. 09/943,576 dated Nov. 2, 2005. (12 pages).
Office Action for U.S. Appl. No. 09/943,576 dated Mar. 22, 2005. (25 pages).
Office Action for U.S. Appl. No. 09/943,576 dated May 16, 2006. (13 pages).
Various pages. www.traderonline.com, 1997–1999. (Also includes waybackmachine.com results.) LEASE TRADER020022–020033. Appendix M approximately Bates 37–42. (12 pages).
Summary Judgment Order, *Swaplease* v. *Sublease EXCHANGE.COM*, Case No. 1:07 CV 045; Filed Jan. 27, 2009; United States District Court for the Southern District of Ohio, Western Division. (30 pages).
Final Judgment Order, *Swapleasev. Sublease EXCHANGE.COM*, Case No. 1:07 CV 045; Filed Apr. 27, 2009; United States District Court for the Southern District of Ohio, Western Division. (1 page).
Notice of Appeal, *Swaplease* v. *Sublease EXCHANGE.COM*, Case No. 1:07 CV 045; Filed May 11, 2009; United States District Court for the Southern District of Ohio, Western Division. (2 pages).
Plaintiff's Motion for Preliminary Injunction and Exhibits 1–5B4, *Swaplease* v. *Sublease EXCHANGE.COM*, Case No. 1:07 CV 045; Filed Jun. 25, 2007; United States District Court for the Southern District of Ohio, Western Division. (171 pages).
Plaintiff's Motion for Preliminary Injunction Exhibits 5C–7, *Swaplease* v. *SUBLEASE EXCHANGE.COM*, Case No. 1:07 CV 045; Filed Jun. 25, 2007; United States District Court for the Southern District of Ohio, Western Division. (110 pages).
Summary Judgment Order of Sublease Exchange.Com, Inc., *Swaplease* v. *Sublease EXCHANGE.COM*, Case No. 1:07 CV 045; Filed Jan. 27, 2009; United States District Court for the Southern District of Ohio, Western Division. (30 pages).
Final Judgment Order of Sublease Exchange.Com, Inc., *Swaplease* v. *Sublease EXCHANGE.COM*, Case No. 1:07 CV 045; Filed Apr. 27, 2009; United States District Court for the Southern District of Ohio, Western Division. (1 page).
Notice of Appeal of Sublease Exchange.Com, Inc., *Swaplease* v. *Sublease EXCHANGE.COM*, Case No. 1:07 CV 045; Filed May 11, 2009; United States District Court for the Southern District of Ohio, Western Division. (2 pages).
Plaintiff's Motion for Preliminary Injunction and Exhibits 1–5B4 of Sublease Exchange.Com, Inc., *Swaplease* v. *Sublease EXCHANGE.COM*, Case No. 1:07 CV 045; Filed Jun. 25, 2007; United States District Court for the Southern District of Ohio, Western Division. (171 pages).
Plaintiff's Motion for Preliminary Injunction Exhibits 5C–7 of Sublease Exchange.Com, Inc., *Swaplease* v. *Sublease EXCHANGE.COM*, Case No. 1:07 CV 045; Filed Jun. 25, 2007; United States District Court for the Southern District of Ohio, Western Division. (110 pages).
Larry E. Wood, User Interface Design: Bridging the Gap from User Requirements to Design, 1998, pp. 1–4. (10 pages).
Office Action for U.S. Appl. No. 09943576 dated Nov. 2, 2005. (10 pages).
Complaint and Demand For Jury Trial, *Swaplease* v. *Sublease EXCHANGE.COM*, Case No. 1:07 CV 045; Filed Jan. 23, 2007; 31 Pages; United Statets District Court for the Southern District of Ohio, Western Division.
Answer and Affirmative Defenses of Sublease Exchange. Com, Inc., *Swaplease* v. *Sublease EXCHANGE.COM*, Case No. 1:07 CV 045; Filed May 2, 2007; 8 Pages; United States District Court for the Southern District of Ohio, Western Division.
Defendant's Rule 26(A)(1) Initial Disclosures, *Swaplease* v. *Sublease EXCHANGE.COM*, Case No. 1:07 CV 045, Filed Jun. 28, 2007; 7 Pages; United States District Court for the Southern District of Ohio, Western Division.
Initial Disclosures of Plaintiff Swaplease, Inc., *Swaplease* v. *Sublease EXCHANGE.COM,* Case No. 1:07 CV 045, Filed Jun. 29, 2007; 4 Pages; United States District Court for the Southern District of Ohio, Western Division.
Notice of Filing Invalidity Contentions, *Swaplease* v. *Sublease EXCHANGE.COM*, Case No. 1:07 CV 045, Filed Sep. 13, 2007; 46 Pages; United States District Court for the Southern District of Ohio, Western Division.
Defendant's Initial Claim Constriction, *Swaplease* v. *Sublease EXCHANGE.COM*, Case No. 1:07 CV 045, Filed Apr. 11, 2008; 2 Pages; United States District Court for the Southern District of Ohio, Western Division.
Defendant's Preliminary Invalidity Contentions, *Swaplease* v. *Sublease EXCHANGE.COM*, Case No. 1:07 CV 045, Filed Apr. 21, 2008; 29 Pages; United States District Court for the southern District of Ohio, Western Division.
Defendant's Updated and Corrected Preliminary Invalidity Contentions, *Swaplease* v. *Sublease EXCHANGE.COM*, Case No. 1:07 CV 045, Filed May 2, 2008; 35 Pages; United States District Court for the Southern District Court for the Southern District of Ohio, Western Division.
Joint Claim Construction and Pre–Hearing Statement, *Swaplease* v. *Sublease Exchange.Com*, Case No. 1:07 CV 045, Filed May 28, 2008; 73 Pages; United States District Court for the Southern District of Ohio, Western Division.
Defendant's Motion to Stay Litigation Pending Reexamination, *Swaplease* v. *Sublease EXCHANGE.COM*, Case No. 1:07 CV 045, Filed Jun. 24, 2008; 14 Pages; United States District Court for the southern District of Ohio, Western Division.
Defendant's Supplemental Rule 26(A)(1) Initial Disclosures, *Swaplease* v. *Sublease EXCHANGE.COM*, Case No. 1:07 CV 045, Filed Jul. 1, 2008; 4 Pages; United States District Court for the Southern District of Ohio, Western Division.

Plaintiff Swaplease, Inc.'s Opposition To Defendant Sublease Exchange.Com, Inc.'s Motion to Stay, *Swaplease* v. *Sublease EXCHANGE.COM*, Case No. 1:07 CV 045, Filed Jul. 9, 2008; 141 Pages; United States District Court for the Southern District of Ohio, Western Division.

Defendant's Reply Memorandum In Support of Motion to Stay Litigation Pending Reexamination, *Swaplease* v. *Sublease EXCHANGE.COM*, Case No. 1:07 CV 045, Filed Jul. 18, 2008; 24 Pages; United States District Court for the Southern District of Ohio, Western Division.

Order: Defendant's Request for Stay of Proceedings Pending Resolution of Inter Partes Re–Examination Petition, *Swaplease* v. *Sublease EXCHANGE.COM*, Case No. 1:07 CV 045, Filed Aug. 1, 2008; 8 Pages; United States District Court for the Southern District of Ohio, Western Division.

Order on Claim Construction, *Swaplease* v. *Sublease EXCHANGE.COM,* Case No. 1:07 CV 045, Filed Oct. 3, 2008; 28 Pages; United States District Court for the Southern District of Ohio, Western Division.

Expert Witness Report of Jorge L. Diaz, *Swaplease* v. *Sublease EXCHANGE.COM*, Case No. 1:07 CV 045, Sep. 30, 2008; 693 Pages; United States District Court for the Southern District of Ohio, Western Division.

Rebuttal Expert Report of Ivan Zatkovich, Concerning the validity of U.S. Patent 6,965,874, Rebuttal to the Invalidity Report of Jorge Diaz, *Swaplease* v. *Sublease EXCHANGE.COM*, Case No. 1:07 CV 045, Nov. 3, 2008; 29 Pages; United States District Court for the Southern District of Ohio, Western Division.

Defendant Sublease Exchange.com, Inc.'s Objections and Responses to Plaintiff Swaplease, Inc.'s First Set of Interrogatories, *Swaplease* v. *Sublease EXCHANGE.COM*, Case No. 1:07 CV 045, Aug. 17, 2007; 22 Pages; United States District Court for the Southern District of Ohio, Western Division.

Defendant Sublease Exchange.com, Inc.'s Objections and REsponses to Plaintiff Swaplease, Inc.'s First Set of Requests for Production of Documents, *Swaplease* v. *Sublease EXCHANGE.COM*, Case No. 1:07 CV 045, Aug. 17, 2007; 25 Pages; United States District Court for the Southern District of Ohio, Western Division.

Defendant's Preliminary Invalidity Contentions, *Swaplease* v. *Sublease EXCHANGE.COM*, Case No. 1:07 CV 045, Sep. 6, 2007; 42 Pages; United States District Court for the Southern District of Ohio, Western Division.

Defendant's Initial List of Claim Terms to be Interpreted, *Swaplease* v. *Sublease EXCHANGE.COM*, Case No. 1:07 CV 045, Oct. 9, 2007; 22 Pages; United States District Court for the Southern District of Ohio, Western Division.

Transcript for Hearing, re: Document 66, Tutorial Demonstration, and Markman Hearing, *Swaplease* v. *Sublease EXCHANGE.COM*, Case No. 1:07 CV 045, Jun. 27, 2008; 75 Pages; United States District Court for the Southern District of Ohio, Western Division.

Office Action for U.S. Appl. No. 11/089,610 dated Jun. 18, 2008. (14 pages).

Office Action for U.S. Appl. No. 09/775,002 dated Mar. 26, 2003. (4 pages).

Office Action for U.S. Appl. No. 09/775,002 dated Sep. 23, 2003. (6 pages).

Office Action for U.S. Appl. No. 09/943,576 dated Feb. 11, 2005. (10 pages).

Office Action for U.S. Appl. No. 09/943,576 dated Mar. 22, 2005. (21 pages).

Office Action for U.S. Appl. No. 09/943,576 dated May 16, 2006. (12 pages).

Joint Motion to Stay Appeal Pending Patent Reexamination, *Swapalease, Inc.,* v. *Sublease EXCHANGE.COM, INC.*, Case No. 2009–1445; Filed Sep. 2, 2009; United States Court of Appeals for the Federal Circuit. (13 pages).

Order to Stay Appeal Pending Patent Reexamination, *Swapalease, Inc.,* v. *Sublease EXCHANGE.COM, INC.*, Case No. 2009–1445; Filed Sep. 18, 2009; United States Court of Appeals for the Federal Circuit. (2 pages).

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-43 are cancelled.

* * * * *